United States Patent [19]
Tanaka et al.

[11] Patent Number: 5,629,740
[45] Date of Patent: May 13, 1997

[54] VIDEO TRANSMITTER FOR EFFECTING AFTER-RECORDING

[75] Inventors: Hiroshi Tanaka; Toru Kawanobe; Masaru Kawazoe, all of Tsurugashima, Japan

[73] Assignee: Toko, Inc., Japan

[21] Appl. No.: 515,336

[22] Filed: Aug. 18, 1995

[30] Foreign Application Priority Data

Aug. 26, 1994 [JP] Japan .................................. 6-225623

[51] Int. Cl.$^6$ .............................. H04N 5/38; H04N 9/475
[52] U.S. Cl. .......................... 348/515; 348/419; 348/423; 348/484; 348/738; 348/462; 395/2.11; 386/104
[58] Field of Search ...................................... 348/419, 484, 348/423, 462, 513, 515, 571, 726, 723, 738; 395/2.1, 2.11, 2.68, 2.69; 369/48, 124; 386/52, 54, 66, 96, 104; H04N 9/475, 5/38, 7/08

[56] References Cited

U.S. PATENT DOCUMENTS

| | | | |
|---|---|---|---|
| 5,153,723 | 10/1992 | Citta | 348/738 |
| 5,313,443 | 5/1994 | Iitsuka | 369/48 |
| 5,329,320 | 7/1994 | Yifrach | 348/738 |
| 5,479,351 | 12/1995 | Woo et al. | 348/515 |
| 5,504,836 | 4/1996 | Loudermilk | 395/2.1 |
| 5,513,010 | 4/1996 | Kori et al. | 386/104 |

FOREIGN PATENT DOCUMENTS

| | | | |
|---|---|---|---|
| 06339124A | 12/1994 | Japan | 348/515 |
| 9424817 | 10/1994 | WIPO | 348/515 |

*Primary Examiner*—John K. Peng
*Assistant Examiner*—Jeffrey S. Murrell

[57] ABSTRACT

In a video transmitter including a first data processing system wherein compressed and encoded video-audio data are read out of a first store under control of a CPU, and then decoded to be reproduced, there is provided a second data processing system for after-recording, data processing operation of which is controlled by a CPU. The second data processing system comprises a audio data compressor, a first buffer memory, a second store, a second buffer memory, and a audio data decoder. Reproducing operations of the first and second data processing systems are performed in synchronism with each other. Thus, with a video transmitter equipped with a codec apparatus, it is possible to achieve after-recording.

4 Claims, 2 Drawing Sheets

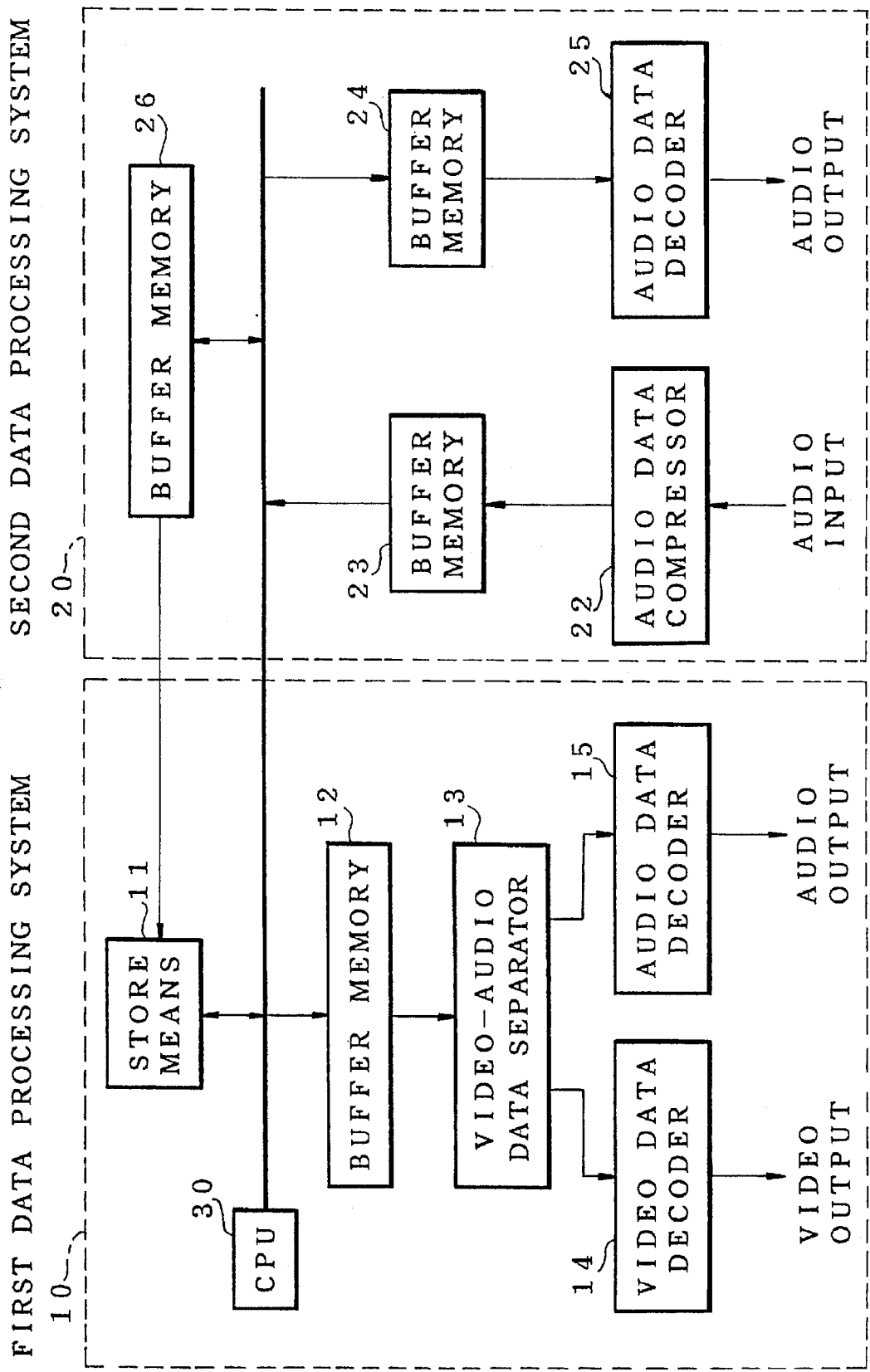

VIDEO TRANSMITTER FOR EFFECTING AFTER-RECORDING

BACKGROUND OF THE INVENTION

1. Field of the Invention

This invention relates to a video transmitter which is arranged such that video-audio data, before being transmitted, are compressed and encoded in a codec apparatus and then temporarily stored in store means.

2. Description of the Prior Art

Among such transmitters equipped with codec apparatus is one which is designed such that live video-audio data, before being transmitted at a great distance, are compressed and encoded in a codec apparatus and then temporarily stored in store means.

In the case where this type of transmitter is used for news collecting purposes, for example, it may sometimes be desired to transmit to the central the collected video-audio data with reporter's news notes added on the spot, instead of transmitting the collected data alone. (Adding separate audio data to the collected video-audio data later will be referred to as "after recording" hereinafter.) With such a transmitter, however, when it is attempted by the reporter to add news notes by means of "after recording", difficulties are experienced in effecting "after recording" since there is a tendency that the audio data representing the news notes and the video data are placed out of timed relationship with each other because of the stored video-audio data being compressed and encoded as mentioned above.

SUMMARY OF THE INVENTION

It is an object of the present invention to make it possible to effect "after recording" with a video transmitter equipped with codec apparatus.

The video transmitter according to the present invention includes, in addition to a first data processing system adapted to serve as a playback system which is included in the conventional video transmitter, the video transmitter according to the present invention includes a second data processing system for effecting "after recording" of sound.

More specifically, according to the present invention, there is provided a video transmitter including a first data processing system which is arranged such that compressed and encoded video-audio data is read out of a first store means under control of a central processing unit (CPU) and then decoded to be reproduced, characterized by the inclusion of a second data processing system for "after recording" which is controlled in terms of data processing operation by means of said CPU, said second data processing system comprising a audio data compressor, a first buffer memory, a second store means, a second buffer memory, and a audio data decoder, wherein during "after recording", in parallel with reproduce process of the first data processing system, audio signal is passed to the audio data compressor; audio data resulting from compression of the audio signal in the audio data compressor is stored in the second store means via the first buffer memory; during playback of "after recording", in parallel with reproduce process of the first data processing system, the audio data is read out of the second store means and in turn is passed to the audio data decoder through the second buffer memory so as to be decoded, while at the same time the first and second data processing systems are synchronized with each other in terms of data processing.

Other objects, features and advantages of the present invention will become apparent from the ensuing description taken in conjunction with the accompanying drawings.

BRIEF DESCRIPTION OF THE DRAWINGS

FIG. 2 is a block diagram illustrating the video transmitter according to a second embodiment of the present invention.

DESCRIPTION OF THE PREFERRED EMBODIMENTS

Figure 1:
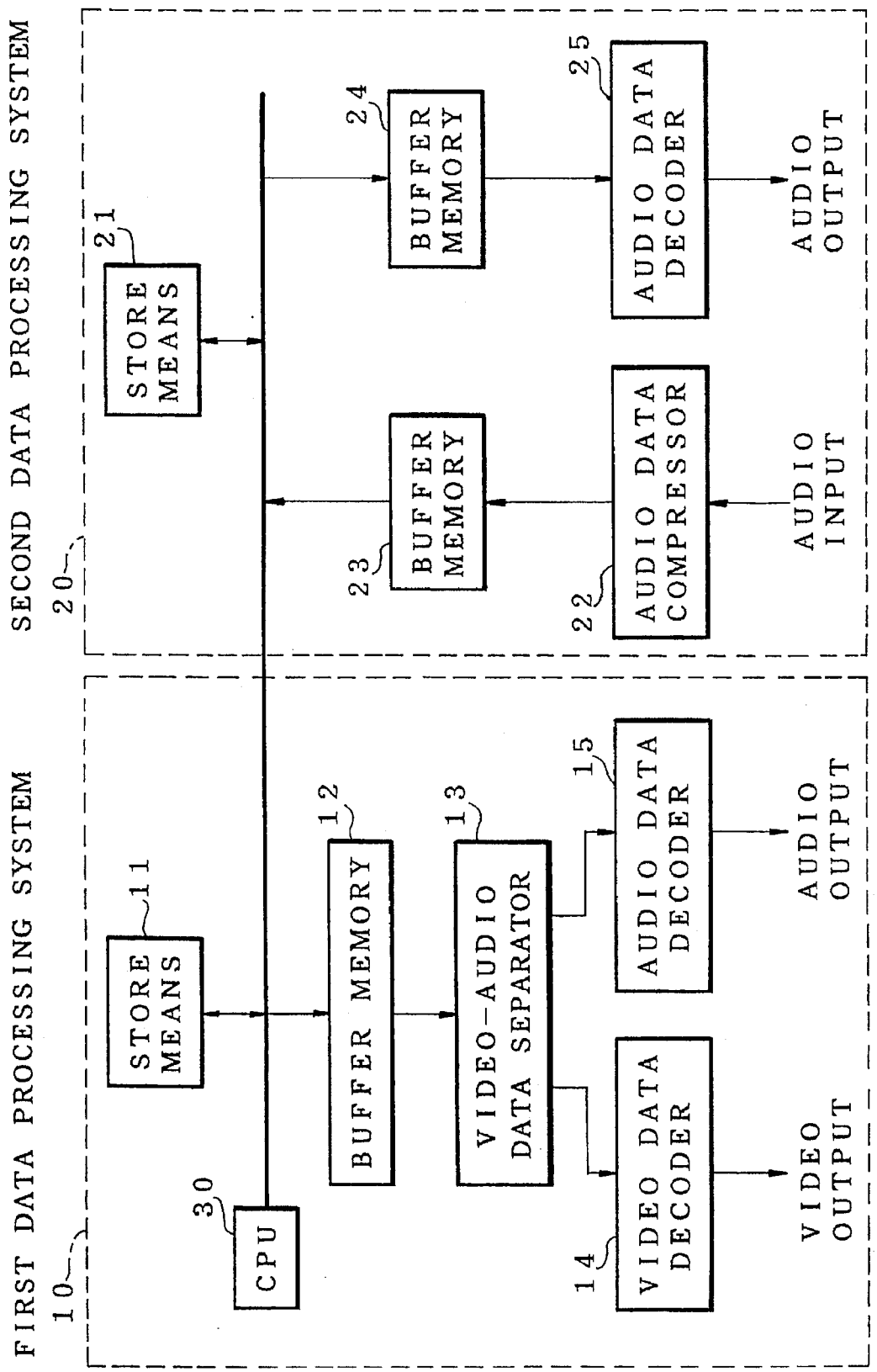
FIG. 1 is a block diagram illustrating the video transmitter according to a first embodiment of the present invention.

Referring to FIG. 1, there is shown a block diagram illustrating the video transmitter according to an embodiment of the present invention, which includes a first data processing system 10 which is included in a conventional video transmitter, and a second data processing system 20 which is additionally provided to effect "after recording" of audio data according to the present invention. Input section of the data processing system 10 is omitted, and only output section thereof is shown.

The first data processing system 10 includes store means 11 storing video-audio data which was compressed and encoded in the input section. More specifically, the first data processing system 10 consists of the store means 11; and a buffer memory 12, a video-audio data separator 13, a video data decoder 14, a audio data decoder 15, and a CPU 30. Video-audio data read out of the store means 11 is passed to the video-audio data separator 13 through the buffer memory 12, and then separated into video data and audio data in the video-audio data separator 13, the video and audio data thus separated being passed to the video data decoder 14 and audio data decoder 15 respectively. Various types of data processing such for example as reading video-audio data out of the the store means 11, writing such data in the buffer memory 12, and so forth are controlled by means of the CPU 30.

The second data processing system 20 comprises a audio data compressor 22, a buffer memory 23, a store means 21, another buffer memory 24, and a audio data decoder 25, wherein data processing in each unit is controlled by the CPU 30 common to the first data processing system 10.

Taking the case where the present video transmitter is used for the purpose of reporting news, description will now be made of a method in which a reporter tries to add comments, by means of "after recording", to video-audio data stored in compressed and encoded form in the store means 11.

In order to effect "after recording", the video-audio data stored in the store means 11 of the first data processing system is first reproduced. More specifically, the video-audio data is read out of the store means 11, then written in the buffer memory 12, and thereafter decoded in the video data decoder 4 and audio data decoder 15 so as to be reproduced in the form of video and audio, respectively. Thus, monitoring the picture viewed on a monitor display (not shown) and audio, the reporter will give suitable comments with respect thereto. With the data processing system 20, the reporter's voice is converted to a audio signal in an AD converter (not shown), then passed to the audio data compressor 22 to be transformed to compressed and encoded audio data, and thereafter stored in the store means 21 through tile buffer memory 23. To keep the difference in timing between the starting time of the video data decoder 14 and audio data decoder 15 and that of the audio data compressor 22 to be one frame or less, the first data processing system 10 is controlled by the CPU 30 so as to be started with frame-unit interrupt. With the second data processing system 20, the audio data stored in the buffer memory 23 is written in the store means 21 each time a predetermined quantity is reached. The first and second data processing systems 10 and 20 are parallelly operated under the control of CPU 30, and the foregoing processing operation is repeated.

To effect reproduction of the "after-recorded" audio data stored in the store means 21, the audio data is read out of the store means 21, and then inputted to the audio data decoder 25 through the buffer memory 24 so as to be decoded. The reproduction of the audio data is effected simultaneously with reproduction of the video-audio data stored in the store means 11 of the first data processing system 10, and the delay time of the audio data is controlled in the buffer memory 24 with the aid of the CPU 30 so that the foregoing two types of reproduction are effected in synchronism with each other.

Time delay which tends to occur in the first data processing system 10 when the video-audio data is reproduced, occur mainly in the buffer memory 12, video data decoder 14 and audio data decoder 15, and such time delay is fixedly determined from the compression ratio of the video-audio data. Since determination of the compression ratio is effected in the CPU 30, the delay time of the audio data in the buffer memory 24 can be controlled in the CPU 30 so that there occurs no difference between the delay time and that occurring with the video-audio data in the first processing system 10.

Although in the foregoing embodiment, "after recorded" audio data were stored in tile store means 21, it is also possible that a fourth buffer memory 26 may be provided in lieu the store means 21 so that audio data written from the buffer memory 23 into tile fourth buffer memory 26 may be written in independent data areas in the store means 11 each time a predetermined quantity of audio data is reached.

As will be appreciated from the foregoing description, according to the present invention, it is possible to achieve "after recording" edition with a video transmitter equipped with a codec apparatus, by virtue of the fact that "after recorded" audio data are stored in independent areas which are in registration in terms of time base with the first data processing system. A portable video transmitter embodying the present invention will be particularly useful when it is attempted to edit video-audio data passed through a codec apparatus, at a news collecting site remote from a broadcasting station.

While the present invention has been illustrated and described with respect to specific embodiments thereof, it is to be understood that the present invention is by no means limited thereto but encompasses all changes and modifications which will become possible within the scope of the appended claims.

We claim:

1. A video transmitter including a first data processing system wherein compressed and encoded video-audio data are read out of a first store means under the control of a CPU and then decoded, said video transmitter comprising a second data processing system including an audio data compressor, a first buffer memory, second store means, a second buffer memory, and an audio data decoder, wherein when after-recording is effected, an audio signal is inputted to said audio data compressor in parallel with a reproduce process of said first data processing system, and audio data resulting from compression of said audio signal in said audio data compressor is stored in said second store means through said first buffer memory; and wherein when after-recording is reproduced, audio data is read out of said second store means in parallel with the reproduce process of said first processing system, then inputted to said audio data decoder through said second buffer memory and decoded, while the data processing operation of said first data processing system and the data processing operation of said second data processing system are effected in synchronism with each other.

2. The video transmitter according to claim 1, wherein said second store means forms an independent area in said first store means.

3. A video transmitter comprising:

a first data processing system wherein compressed and encoded video-audio data are read out of a first store means under control of a CPU and then separated into video and audio data which in turn are decoded and reproduced;

an audio data compressor wherein a audio signal to be added during after-recording operation is inputted in parallel with reproduce process of said first data processing system and said audio signal is compressed and converted to audio data which in turn is passed to a first buffer memory;

the first buffer memory being adapted for transmitting said audio data to a second store means;

the second store means being arranged such that said audio data inputted thereto from said audio data compressor through said first buffer memory is stored therein and during reproduction of after-recording, said audio data is read out in parallel with the reproduce process of said first data processing system and transferred to a second buffer memory;

the second buffer memory being adapted for transferring said audio data to an audio data decoder during reproduction of after-recording; and the audio data decoder being adapted for decoding said audio data during reproduction of after-recording, wherein the data processing operations of said first and second data processing systems are synchronized with the aid of a CPU.

4. A portable video transmitter, comprising the video transmitter as defined in claim 3.

* * * * *